United States Patent
Haag

(10) Patent No.: US 11,311,968 B2
(45) Date of Patent: Apr. 26, 2022

(54) MACHINING UNIT FOR MACHINING A WORKPIECE USING A THERMAL MACHINING BEAM, HAVING A COUPLING DEVICE

(71) Applicant: TRUMPF Werkzeugmaschinen GmbH + Co. KG, Ditzingen (DE)

(72) Inventor: Valentin Haag, Stuttgart (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 477 days.

(21) Appl. No.: 16/227,172

(22) Filed: Dec. 20, 2018

(65) Prior Publication Data

US 2019/0118293 A1    Apr. 25, 2019

Related U.S. Application Data

(63) Continuation of application No. PCT/EP2016/064672, filed on Jun. 24, 2016.

(51) Int. Cl.
*B23K 26/14*    (2014.01)
*B23K 26/70*    (2014.01)
(Continued)

(52) U.S. Cl.
CPC ........ *B23K 26/147* (2013.01); *B23K 15/0026* (2013.01); *B23K 15/0046* (2013.01);
(Continued)

(58) Field of Classification Search
CPC ...... B23K 26/14; B23K 26/147; B23K 26/21; B23K 26/702; B23K 15/0026; B23K 15/0046; B23K 26/1482
(Continued)

(56) References Cited

U.S. PATENT DOCUMENTS 6,144,008 A    11/2000  Rabinovich
6,204,475 B1 *  3/2001  Nakata ................ B23K 26/147
                                                        219/121.84
(Continued)

FOREIGN PATENT DOCUMENTS

EP    1733837    12/2006
JP    5718495 A   11/1982
(Continued)

OTHER PUBLICATIONS

KR Notice of Allowance in Korean Appln. No. 10-2019-7002118, dated Nov. 6, 2020, 6 pages (with English translation).
(Continued)

*Primary Examiner* — John J Norton
*Assistant Examiner* — Simpson A Chen
(74) *Attorney, Agent, or Firm* — Fish & Richardson P.C.

(57) ABSTRACT

This disclosure describes machining units for machining a workpiece, in particular for welding a workpiece by, using a thermal machining beam. The thermal machining beam can be directed onto a workpiece along a beam incidence axis by means of the machining unit, wherein the machining unit has a rotary drive device by means of which an auxiliary module for workpiece machining is rotatable about the beam incidence axis. The machining unit includes a coupling device by which the auxiliary module can be moved between a position coupled to the rotary drive device and a position uncoupled from the rotary drive device.

16 Claims, 8 Drawing Sheets

(51) Int. Cl.
 *B23K 26/21* (2014.01)
 *B23K 15/00* (2006.01)
(52) U.S. Cl.
 CPC .......... *B23K 26/1482* (2013.01); *B23K 26/21* (2015.10); *B23K 26/702* (2015.10)
(58) Field of Classification Search
 USPC ............. 219/121.64, 121.33, 121.13, 121.14
 See application file for complete search history.

(56) References Cited

U.S. PATENT DOCUMENTS

| | | | | |
|---|---|---|---|---|
| 2006/0153668 | A1* | 7/2006 | Weick ................ | B23K 26/1488 414/776 |
| 2009/0181838 | A1* | 7/2009 | Schmauder ........ | B23K 26/1482 483/16 |
| 2011/0024402 | A1* | 2/2011 | Hozumi ................ | B23K 26/21 219/121.64 |

FOREIGN PATENT DOCUMENTS

| | | |
|---|---|---|
| JP | S5974505 | 4/1984 |
| JP | S63-33187 | 2/1988 |
| JP | 09271965 A * | 10/1997 |
| JP | H09271965 | 10/1997 |
| JP | H1062295 | 3/1998 |
| JP | H10225787 | 8/1998 |
| JP | H11114741 | 4/1999 |
| JP | 2003-017666 | 1/2003 |
| JP | 2007-290015 | 11/2007 |
| JP | 2013-039594 | 2/2013 |
| KR | 10-2008-0101625 A | 11/2008 |

OTHER PUBLICATIONS

International Search Report and Written Opinion in International Application No. PCT/EP2016/064672, dated Mar. 24, 2017, 16 pages (with English translation).
CN Office Action in Chinese Appln. No. 201680087086, dated Jul. 2, 2020, 18 pages (with English translation).
CN Search Report in Chinese Appln. No. 201680087086, dated Jun. 28, 2020, 4 pages (with English translation).
JP Office Action in Japanese Appln. No. 2018-567161, dated Jan. 27, 2020, 4 pages (with English translation).

* cited by examiner

MACHINING UNIT FOR MACHINING A WORKPIECE USING A THERMAL MACHINING BEAM, HAVING A COUPLING DEVICE

CROSS REFERENCE TO RELATED APPLICATIONS

This application is a continuation of and claims priority under 35 U.S.C. § 120 from PCT Application No. PCT/EP2016/064672 filed on Jun. 24, 2016, the entire contents of which is incorporated herein by reference.

TECHNICAL FIELD

The disclosure relates to a machining unit for machining a workpiece, in particular for welding a workpiece, using a thermal machining beam such as a laser machining beam.

BACKGROUND

In the machining of a workpiece with the aid of a thermal machining beam, for example in laser welding a workpiece, it is commonplace for auxiliary modules such as, for example, a laterally disposed shield gas or auxiliary wire nozzle, to be used in addition to the device that directs and optionally focuses the laser beam onto the workpiece. For example, a machining unit in the form of a laser machining head provided with a laterally disposed gas nozzle for feeding operating gas to the machining location is known from JP 10-62295. For any limitations in workpiece machining by virtue of potential collisions between the laterally disposed gas nozzle and the workpiece or workpiece holders to be reduced, the gas nozzle is rotatable by a rotary drive device about the beam incidence axis of the laser machining head. Similar machining units are also disclosed in JP 57-184595 A and JP 09-271965 A.

SUMMARY

This disclosure provides machining units that while having a small interference contour are distinguished by a wide application spectrum.

The machining units disclosed herein serve for workpiece machining by welding using a thermal machining beam such as a laser machining beam. The thermal machining beam can be directed onto a workpiece by the machining unit along a beam incidence axis. The machining unit furthermore includes an auxiliary module that can be configured so as to be separate from the machining unit and by which the beam is directed onto the workpiece. For flexible workpiece machining, the auxiliary module can be rotated about the beam incidence axis by a rotary drive device.

The machining units include a coupling device to selectively couple the auxiliary module to the rotary drive device or to arrange the auxiliary module in an uncoupled position. By the coupling device, the auxiliary module can thus be coupled to the rotary drive device for the rotational positioning about the beam incidence axis and can be arranged in a position uncoupled from the rotary drive device.

The uncoupled position can be chosen such that the auxiliary module is relatively remote from the machining location of the machining unit. The auxiliary module when not required for the current workpiece machining can thus be moved out of that region of the machining unit that is particularly critical in terms of potential collisions with the workpiece or other components. The effective interference contour of the machining unit is significantly reduced as compared to a machining unit in which the auxiliary module cannot be moved to an uncoupled position.

A further advantage of the coupling device results in the rotary drive device being used for the rotational positioning of a further machining module, which is not always used in conjunction with the auxiliary module. The auxiliary module, when the latter is not required for a machining task, can thus be moved to the uncoupled position. The auxiliary module in this instance does not have to be conjointly rotated in the rotational positioning of the further machining module.

In some embodiments, the auxiliary module is an infeed module by which an additive or an auxiliary medium can be fed to the machining location where the thermal machining beam acts on the workpiece. Such an infeed module typically is coupled to the rotary drive device close to the machining location of the machining unit for the additive or the auxiliary medium to be fed to the machining location in a functionally reliable manner. Such an auxiliary module therefore represents a particularly relevant interference contour in the direct vicinity of the machining location. On the other hand, the use of the auxiliary module is optionally not required in the case of some machining tasks. In this case, the auxiliary module can be transferred from the collision zone to an uncoupled position via the coupling device.

An example of such an infeed module includes a nozzle assembly for a shield or operating gas. Feeding a shield or operating gas to the machining location with the aid of an auxiliary module is not required in the case of all machining of workpieces, e.g., machining by welding, so that transferring the auxiliary module to an uncoupled position can be particularly advantageous.

A further example of an auxiliary module in which the coupling device is particularly advantageous is an infeed module, which has an infeed device for a welding additive, e.g., an auxiliary wire. A single machining unit for welding can be used for machining by welding with and without the use of an additive, while the interference contour of the machining unit close to the machining location is not unnecessarily enlarged by the auxiliary module during the machining without an additive, because the auxiliary module can be transferred to the uncoupled position.

By virtue of connectors and conveying hoses that are optionally present, it is particularly advantageous in the case of infeed modules for additives if the infeed module needs to be conjointly rotated by the rotary drive device only when actually required.

In some embodiments, the coupling device at least in the position of the auxiliary module coupled to the rotary drive device can be uncoupled from the auxiliary module. Consequently, the coupling device does not have to be conjointly rotated by the rotary drive device when rotationally positioning the coupled auxiliary module. This has advantages in terms of the dynamics of the rotational positioning as well as for the constructive design of the coupling device, which consequently can be designed so as to be rotationally fixed about the beam incidence axis and thus be simpler in terms of construction.

In some embodiments, to achieve a high degree of automation, the coupling device has a drive by which the auxiliary module can be moved between the position coupled to the rotary drive device and the uncoupled position.

In some embodiments, the auxiliary module can be pivoted by the coupling device between the position coupled to the rotary drive device and the uncoupled position. Advantages result in the constructive integration of the coupling device in the machining unit. The pivoting movement can be performed about a pivot axis that runs obliquely, e.g., perpendicularly, to the beam incidence axis.

A particularly robust and compact variant results when the coupling device has a loading arm, e.g., a pivotable loading arm, which can be coupled to the auxiliary module. The machining unit can include a second auxiliary module that is rotated by the rotary drive device about the beam incidence axis. The rotary drive device can simultaneously serve for the rotational positioning of two auxiliary modules having dissimilar tasks. For example, the first auxiliary module can serve for feeding an additive, e.g., an auxiliary wire. The second auxiliary module can be, for example, an infeed module for operating gas or shield gas, respectively. The use of an infeed module for operating or shield gas is required in various machining tasks, e.g., machining by welding, but no additive (auxiliary wire) is required. In the case of these machining tasks, the first auxiliary module can be transferred to the uncoupled position by the coupling device.

In some embodiments, the machining unit includes a second auxiliary module that can be coupled to the rotary drive device by the first or a second coupling device for the rotational positioning about the beam incidence axis, and can be arranged in a position uncoupled from the rotary drive device. In one embodiment, the first coupling device simultaneously serves to couple and uncouple the first and the second auxiliary modules and has a comparatively compact construction. By contrast, in a second embodiment, a second coupling device is provided for the second auxiliary module and is distinguished by high flexibility.

In other embodiments, selectively no auxiliary module, only the first, only the second, or both auxiliary modules is/are couplable to the rotary drive device for the rotational positioning about the beam incidence axis, and these are also distinguished by a particularly high adaptability to the respective machining task.

To reduce the risk of the rotary drive device being compromised even in the event of potential collisions of the machining unit, the rotary drive device can have a safety coupling.

In some embodiments, the rotary drive device is provided with a rotational position referencing device. It can be guaranteed by way of this measure that the rotary drive device can always assume predefined rotational positions with high precision.

A particularly compact construction mode results when the rotary drive device includes a rotary lead-through for an additive or an auxiliary medium, respectively, which are feedable from the auxiliary module to the machining location. Conveying hoses can, at least in part, be omitted. Moreover, the rotary lead-through can enable the infeed module to be endlessly rotatable about the beam incidence axis.

In some embodiments, the first and/or optionally the second auxiliary module are/is endlessly rotatable about the beam incidence axis by the rotary drive device.

In some embodiments, the machining beam is guided through the rotary drive device and is likewise distinguished by a particularly compact construction.

It is advantageous for a multiplicity of machining tasks, e.g., machining by welding, if the machining unit has a machining nozzle through which the machining beam is guided before the latter meets the workpiece. The machining nozzle serves for the (coaxial) infeed of shield gas or operating gas to the machining location, for example. Alternatively or additionally, the nozzle mounting of the machining nozzle can also have a so-called cross-jet device.

The machining nozzle can be configured so as to be separate from the auxiliary module or modules. An auxiliary module or modules, which in the position thereof coupled to the rotary drive device is/are arranged so as to be laterally beside the machining nozzle is/are of particular significance in practice.

In some embodiments, for the thermal machining beam, e.g., the laser machining beam, to be directed and focused onto the workpiece, the machining unit includes an optical system. It is typically sufficient and thus preferred for the machining nozzle to be connected in a rotationally fixed manner to the optical system.

In some embodiments, the rotary drive device is integrated in a compact manner in the machining unit in that the rotary drive device is arranged between the optical system and the (optionally rotationally fixed) machining nozzle.

The machining unit can be fastened to a motion drive device. By the motion drive device the machining unit, conjointly with the optical system, the auxiliary module, and the coupling device, is movable relative to the workpiece. The machining unit is configured as a machining head. The motion drive device conjointly with the machining unit fastened thereto forms a machining device. A handling robot by which the machining unit, or the machining head, respectively, can be moved relative to a workpiece is to be referred to as a motion drive device, for example.

In some embodiments, the auxiliary module includes a nozzle assembly for shield gas or operating gas, respectively, and the machining device includes a nozzle magazine from which nozzles for the auxiliary modules are interchangeable by the coupling device. A highly flexible machining device that can be adapted in an automated manner to the respective machining task results.

Further embodiments are the subject matter of the dependent claims and of the exemplary embodiments described hereunder. The invention will furthermore be explained in more detail by exemplary embodiments with reference to the appended figures.

DETAILED DESCRIPTION

Figure 1:
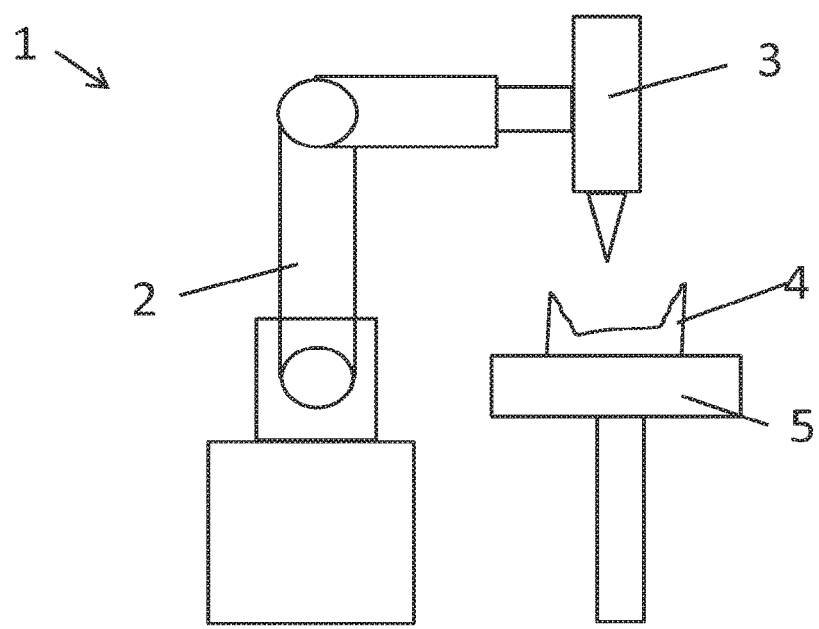
FIG. 1 shows a laser welding device having a laser welding head and a handling robot.

A machining device 1 having a motion drive device in the form of a handling robot 2 is shown in an exemplary manner in FIG. 1. The machining device 1 is configured as a laser welding device. To this end, a machining unit configured as a laser welding head 3 is fastened to the arm of the handling robot 2. For carrying out various welding tasks the welding head 3 is movable by the handling robot 2 relative to a workpiece 4 that is disposed on a workpiece table 5.

Various examples of a machining unit, e.g., of a laser welding head 3 such as can be used, for example, in a machining device 1 of FIG. 1, will be described hereunder with reference to the further figures.

Figure 2:
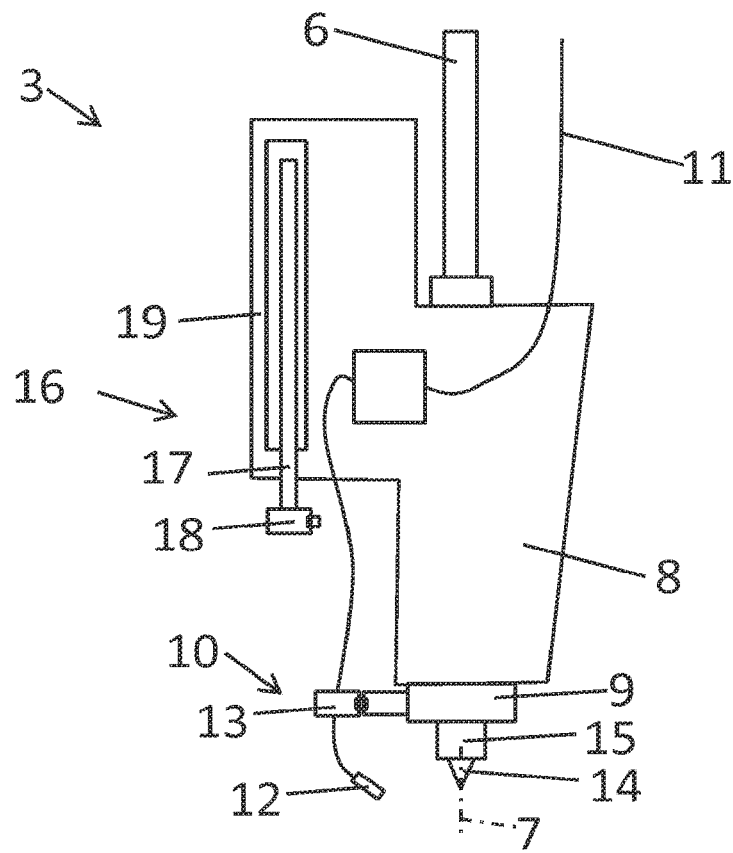
FIGS. 2 to 4 show a first example of a laser welding head having an auxiliary module and a coupling device in three different states.
Figure 3:
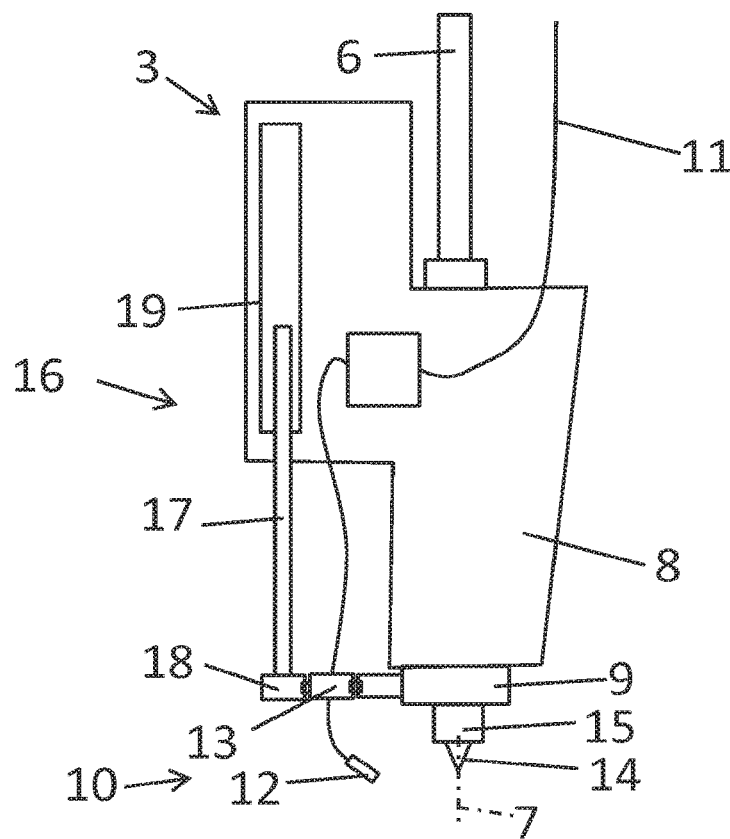
Figure 4:
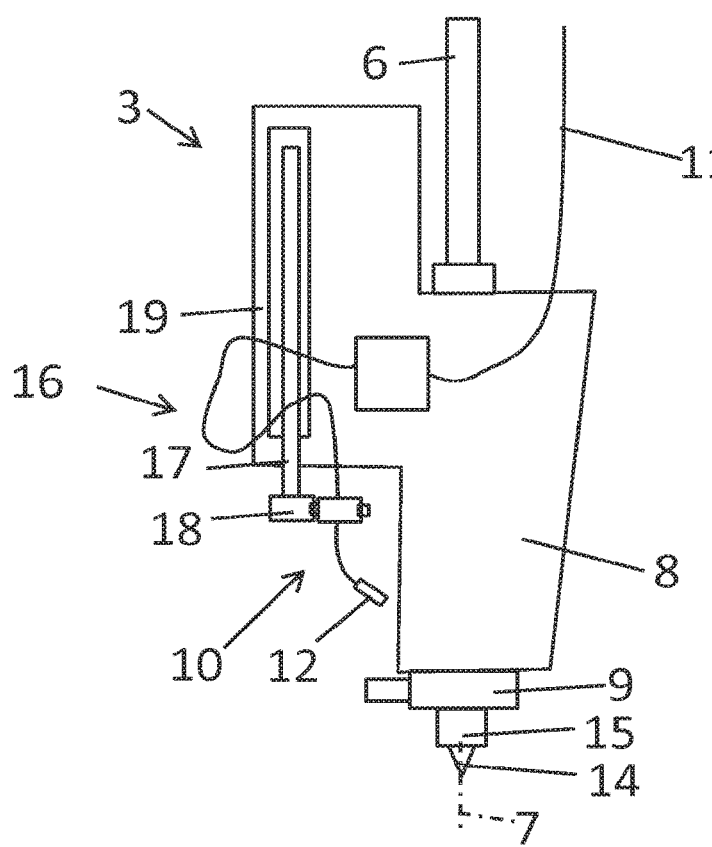

A first example of a laser welding head 3 is shown in three different states in FIGS. 2 to 4. A laser machining beam that is fed through a laser cable 6 to the welding head 3 can be directed onto a workpiece 4 along a beam incidence axis 7 by the laser welding head 3. For the laser beam to be directed and focused onto the workpiece 4 the welding head 3 has an optical system 8. The optical system 8 includes, for example, one or a plurality of laser lenses or mirrors. The optical system 8 is not shown in more detail in the figures.

The welding head 3 furthermore has a rotary drive device 9 by which an auxiliary module 10 for the workpiece machining is rotatable about the beam incidence axis 7, and the machining beam is guided through the rotary drive device 9.

The auxiliary module 10 in the example shown is configured as an infeed device by which an additive can be fed to the machining location where the thermal machining beam acts on the workpiece 4. This can be an infeed device for a welding additive such as an auxiliary wire. The infeed device has a conveying hose 11 for the auxiliary wire, the conveying hose 11 opening into a wire nozzle 12. The wire nozzle 12 is couplable to the rotary drive device 9 by a releasable coupling 13.

Alternatively, the auxiliary module 10 can also be configured as a nozzle assembly for shield gas or operating gas. An example of a laser welding head 3 having such an auxiliary module as a further auxiliary module will be described further below. In the case of an example of a laser welding head 3 not shown, only one auxiliary module having a nozzle assembly can also be provided, the auxiliary module being activatable and deactivatable by a coupling device.

The laser welding head 3 of FIGS. 2 to 4 has a machining nozzle 14 that is separate from the auxiliary module 10 and through which the machining beam is guided before the latter meets the workpiece 4. The machining nozzle 14 can serve for the coaxial infeed of shield gas or operating gas. Alternatively or additionally, a nozzle mounting 15 of the machining nozzle 14 can be provided with a cross-jet device. By way of the nozzle mounting 15, the machining nozzle 14 is connected in a rotationally fixed manner to the optical system 8 or the housing of the optical system 8, respectively, and the rotary drive device 9 is disposed between the optical system 8 and the machining nozzle 14.

The machining unit furthermore has a coupling device 16 by which the auxiliary module 10 can be moved between a position coupled to the rotary drive device 9 and a position uncoupled from the rotary drive device 9. The coupling device 16 has a loading arm 17 that includes a coupling 18 by which the loading arm 17 is attachable to the auxiliary module 10. The coupling device 16 moreover has a linear drive 19 by which the auxiliary module 10 is movable between the coupled and the uncoupled position. The linear drive 19 can be an electric spindle drive, a hydraulic lifting cylinder, or a pneumatic lifting cylinder, for example.

The auxiliary module 10 in FIG. 2 is shown in that position in which the auxiliary module 10 is coupled to the rotary drive device 9. The auxiliary module 10 in this position is disposed so as to be laterally beside the machining nozzle 14. To this extent, the auxiliary module 10 represents a relevant interference contour in the workpiece machining. The coupling device 16 in FIG. 2 is uncoupled from the auxiliary module 10 and is located in a retracted resting position.

The conditions when the auxiliary module 10 is being coupled to the rotary drive device 9 or is being uncoupled from the latter are shown in FIG. 3. The loading arm 17 is displaced from the resting position downward to a coupling position by the linear drive 19. A locking cylinder (not shown in detail), which serves for unlocking the coupling 18 on the loading arm and for locking the coupling 13 on the rotary drive, or vice versa, is fastened to the lower end of the loading arm 17, for example.

The auxiliary module 10 is shown in the uncoupled position in FIG. 4. Proceeding from FIG. 3, the loading arm 17 conjointly with the auxiliary module 10 fastened thereto is displaced upward to the retracted resting position. In this arrangement, machining of a workpiece can only be performed without the use of the auxiliary module 10, but the auxiliary module 10 does not represent any interference contour for this arrangement. Machining by welding can be carried out with a very tight profile, for example.

Further variants of a laser welding head 3 with many components that are identical to the variant of FIGS. 2 to 4 are shown in FIGS. 5 to 10. The same reference signs have therefore been used for identical or equivalent components, and a repetition of the explanation of the functions of the identical or equivalent components has been dispensed with.

Figure 5:
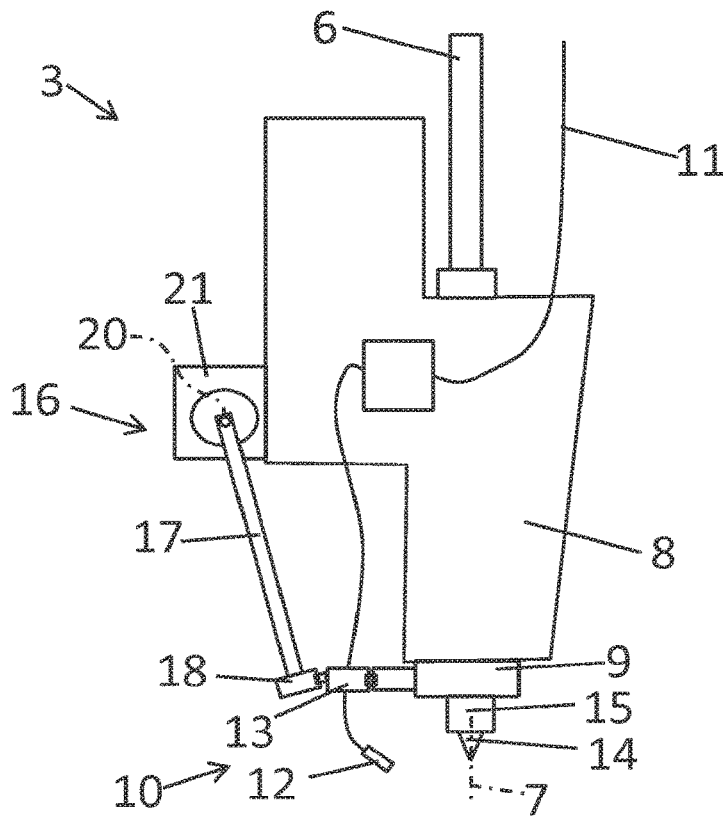
FIGS. 5 and 6 show a second example of a laser welding head having an auxiliary module and a coupling device in two different states.
Figure 6:
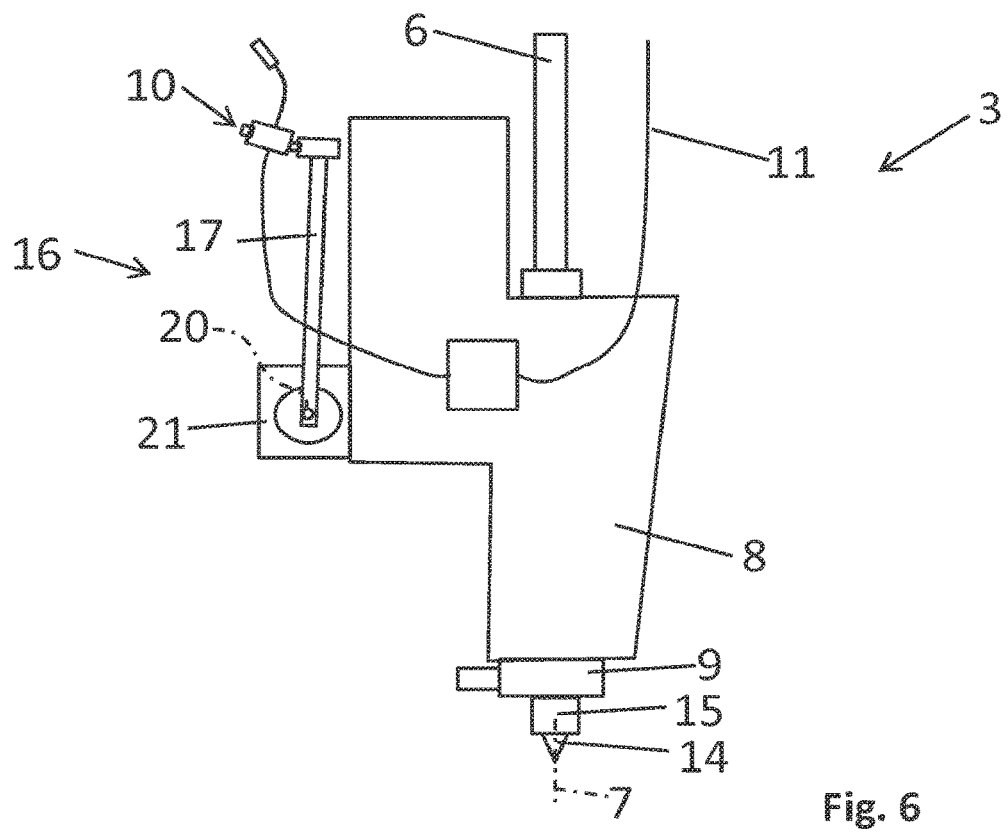

The variant of FIGS. 5 and 6 differs from the variant of FIGS. 2 and 4 substantially in that the loading arm 17 of the coupling device 16 is pivotable for the auxiliary module 10 to be transferred between the coupled and the uncoupled position. The pivot axis 20 in the case of the example shown in FIGS. 5 and 6 runs perpendicularly to the drawing plane of the figures as well as perpendicularly to the beam incidence axis 7.

The conditions when the auxiliary module 10 is being coupled to the rotary drive device 9 by the loading arm 17 are shown in FIG. 5. By contrast, the conditions when the auxiliary module 10 is disposed in the uncoupled position are shown in FIG. 6. An electric rotary drive 21 is provided, for example, for carrying out the pivoting movement of the loading arm 17.

Figure 7:
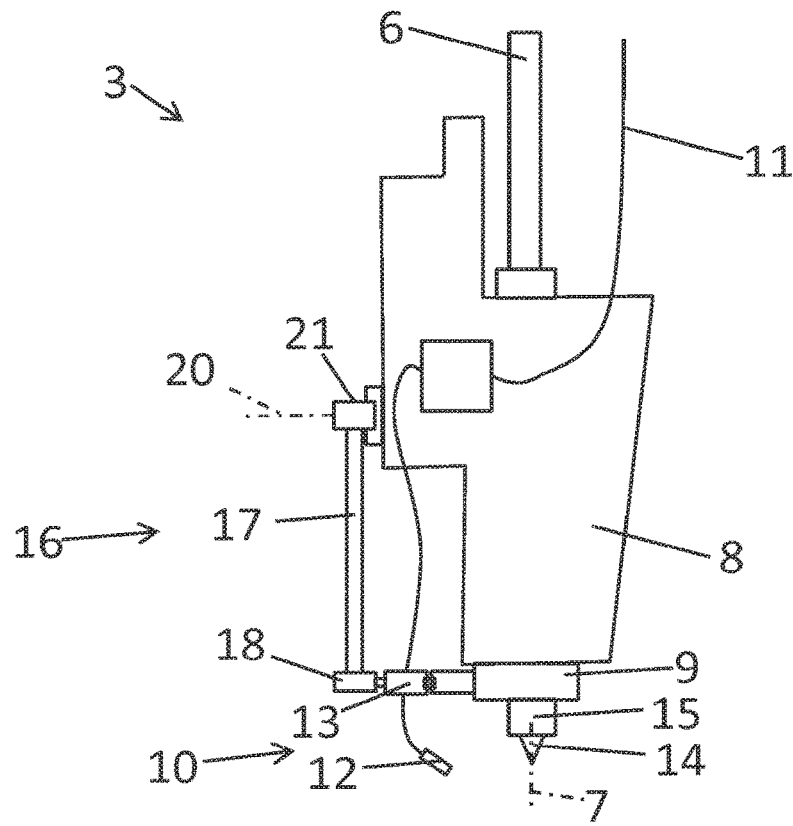
FIGS. 7 and 8 show a third example of a laser welding head having an auxiliary module and a coupling device in two different states.
Figure 8:
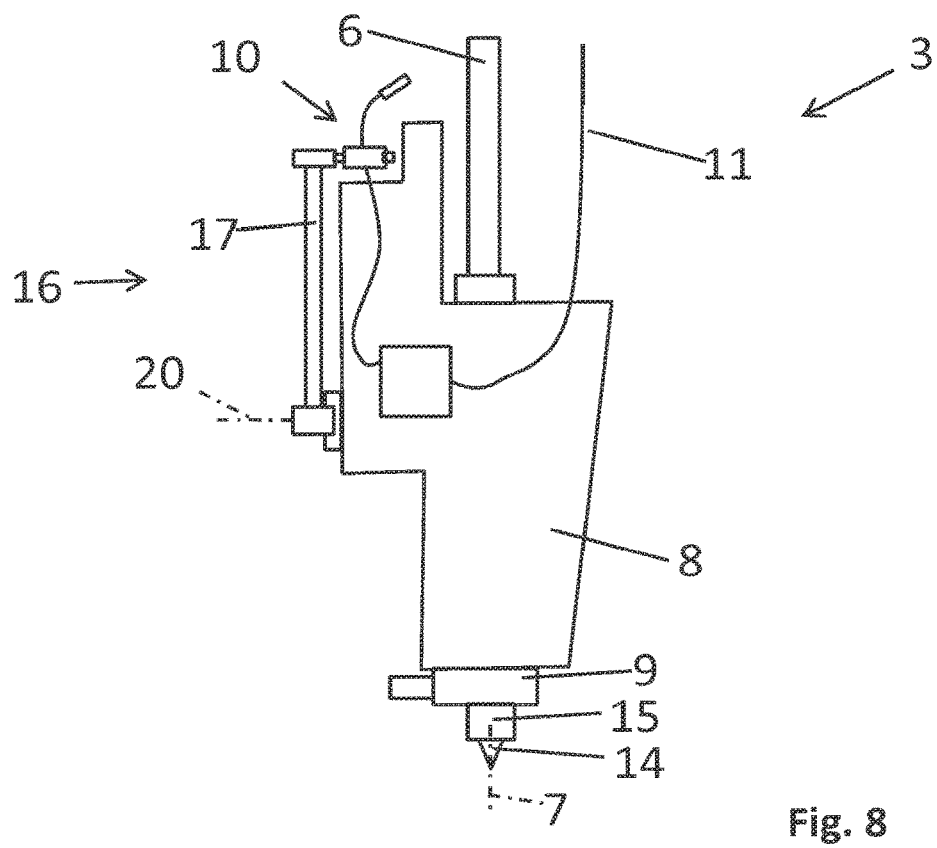

A further example of a laser welding head 3 in which the loading arm 17 of the coupling device 16 is pivotable by a rotary drive 21 about a pivot axis 20 that runs perpendicularly to the beam incidence axis 7 is shown in FIGS. 7 and 8. As opposed to FIGS. 5 and 6, however, the pivot axis 20 runs in the drawing plane of FIGS. 7 and 8.

Figure 9:
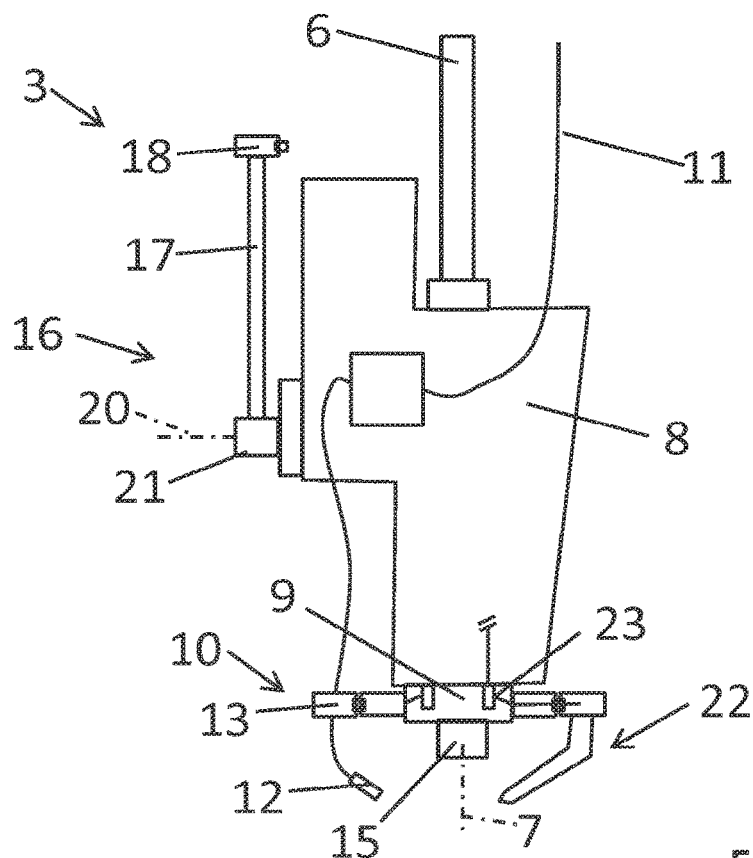
FIGS. 9 and 10 show a fourth example of a laser welding head having two auxiliary modules and a coupling device in two different states.
Figure 10:
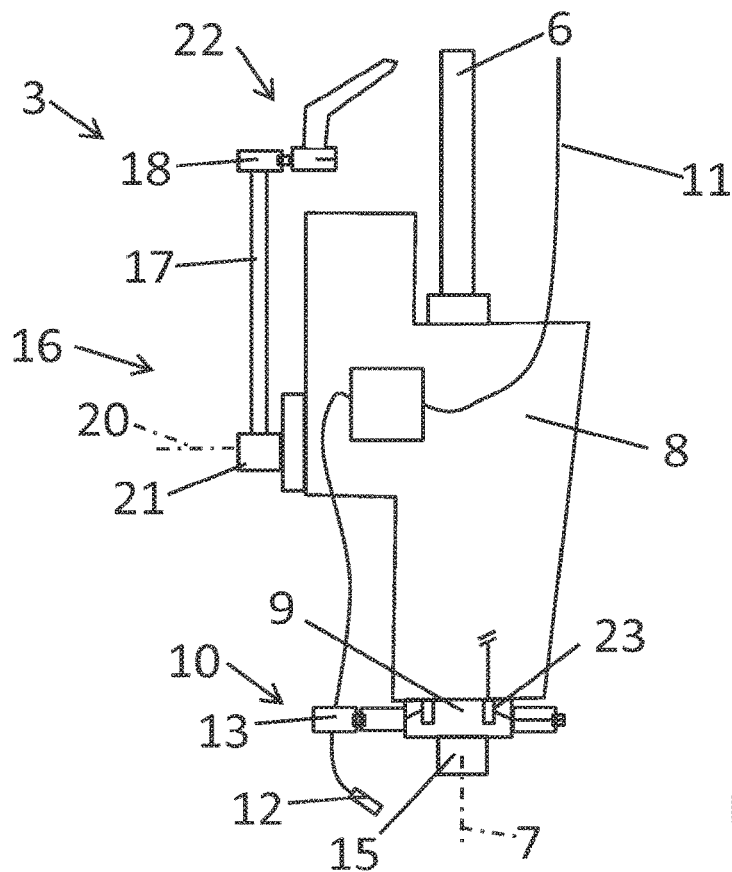

A variant of a laser welding head 3 in which the loading arm 17 of the coupling device 16 is pivotable by a rotary drive 21 about a pivot axis 20 that runs perpendicularly to the beam incidence axis 7 and in the drawing plane of the figures is also shown in FIGS. 9 and 10. As opposed to the variants previously described, the laser welding head 3 has a second auxiliary module 22 that is rotatable about the beam incidence axis 7 by the rotary drive device 9. The second auxiliary module 22 has a nozzle assembly for shield or operating gas. The rotary drive 9 has a rotary lead-through 23 for feeding the gas to the nozzle assembly. Thanks to this rotary lead-through 23, the auxiliary module is endlessly rotatable about the beam incidence axis 7 by the rotary drive device 9. In the example shown, this applies only when the first auxiliary module 10 is not coupled to the rotary drive device 9. Since shield or operating gas can be fed to the machining location by way of the second auxiliary module 22, the machining nozzle 14 can also be omitted.

The coupling device 16 of FIGS. 9 and 10 is configured in a manner analogous to that of the coupling device 16 of FIGS. 7 and 8. However, the coupling device 16 of FIG. 9 and 10 is capable of transferring the first as well as the second auxiliary module 10, 22 between a position coupled to the rotary drive device 9 and a position uncoupled from the rotary drive device 9.

The conditions when both auxiliary modules 10, 22 are coupled to the rotary drive device 9 are shown in FIG. 9. In FIG. 10 the first auxiliary module 10 is disposed in the coupled position and the second auxiliary module 22 is disposed in the uncoupled position. For the laser welding head 3 to be transferred from the state of FIG. 9 to the state of FIG. 10, the rotary drive device 9 first rotates the second auxiliary module 22 to a rotational position in which the second auxiliary module 22 can be gripped by the loading arm 17. A rotation by 180° is to be carried out to this end. The loading arm 17 can subsequently uncouple the auxiliary module 22 from the rotary drive device 9.

The laser welding head 3 similar to that of FIGS. 9 and 10 can have an uncoupled auxiliary module 10, 22 that can be transferred to an auxiliary module mounting, for example. In this case it would be possible for both auxiliary modules 10, 22 to be simultaneously uncoupled from the rotary drive device 9, or neither auxiliary module 10, 22, only the first, only the second, or both, of the auxiliary modules 10, 22 to be coupled to the rotary drive device 9 for the rotational positioning about the beam incidence axis 7.

In some embodiments, a second coupling device is provided for the second auxiliary module 22. In this case, neither auxiliary module 10, 22, only the first, only the second, or both, auxiliary modules 10, 20 are couplable to the rotary drive device 9 for the rotational positioning about the beam incidence axis 7.

Figure 11:
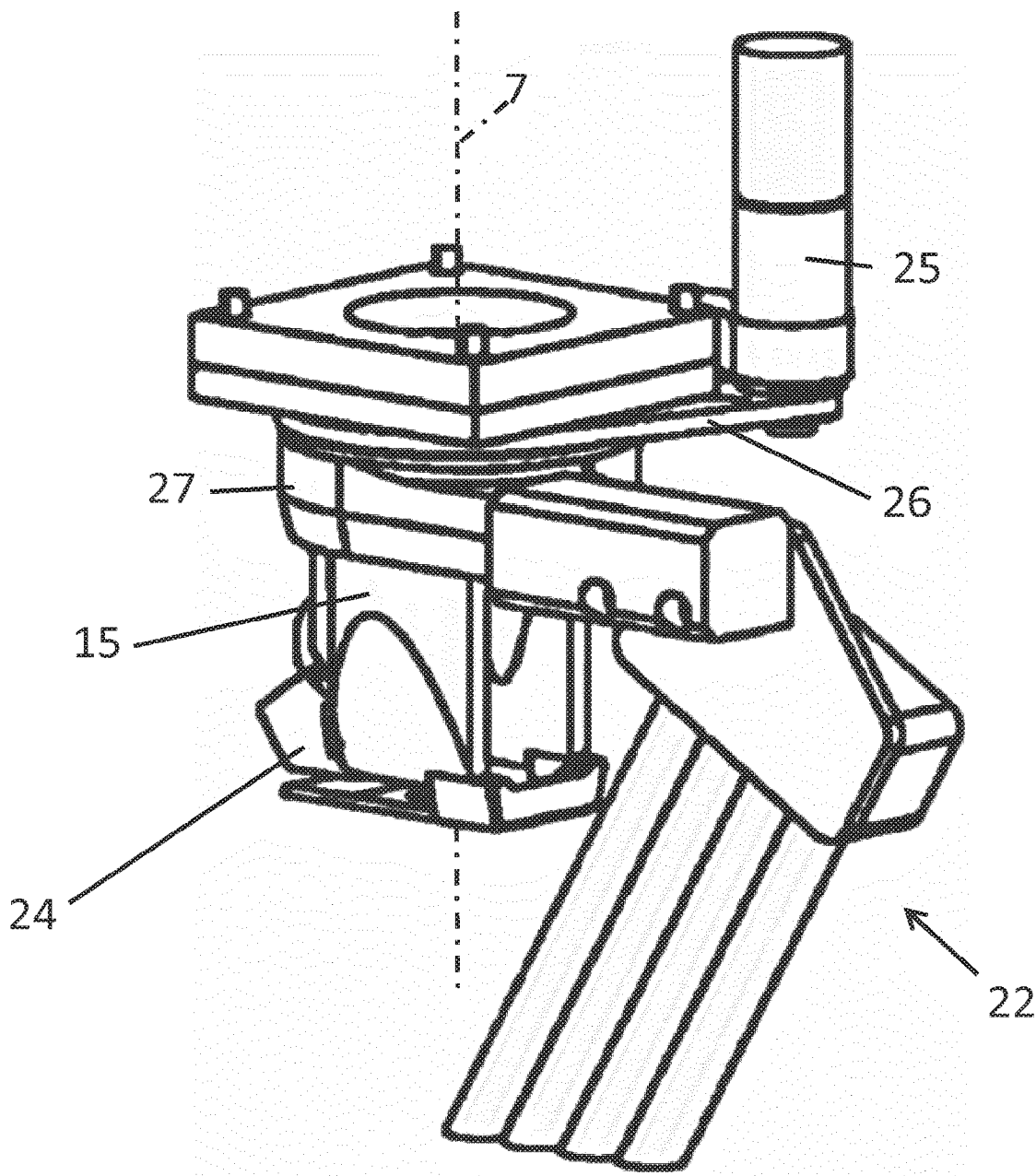
FIG. 11 shows a perspective view of parts of a fifth example of a laser welding head.

Part of a laser welding head 3 analogous to that of the variant of FIGS. 9 and 10 is shown in an exemplary manner in FIG. 11. The second auxiliary module 22 has a nozzle assembly having a plurality of operating gas or shield gas nozzles that are fastened so as to be lateral to a machining nozzle 14. The nozzle mounting 15 has a cross-jet device 24. The nozzle mounting 15 is fastened in a rotationally fixed manner to an optical system 8 (not shown). The rotary drive device 9 is disposed between the nozzle mounting 15 and the optical system 8 (not shown). An electric motor 25 that transmits the rotational movement to a rotary actuator part 27 by a V-belt 26 is provided for generating the rotating movement. The shield gas nozzle assembly of the second auxiliary module 22 is releasably coupled to the rotary actuator part 27. In FIG. 11, the first auxiliary module 10 is not coupled to the rotary drive device 9 and therefore not shown. A rotary lead-through (obscured in FIG. 11) for the gas is provided in the rotary actuator part 27.

The rotary drive device 9 of all of the variants shown can be provided with a safety coupling. It is thus ensured that the laser welding head 3 does not incur any damage even in the event of a collision between the auxiliary modules 10, 22 and a workpiece 4 and workpiece holders.

Figure 12:
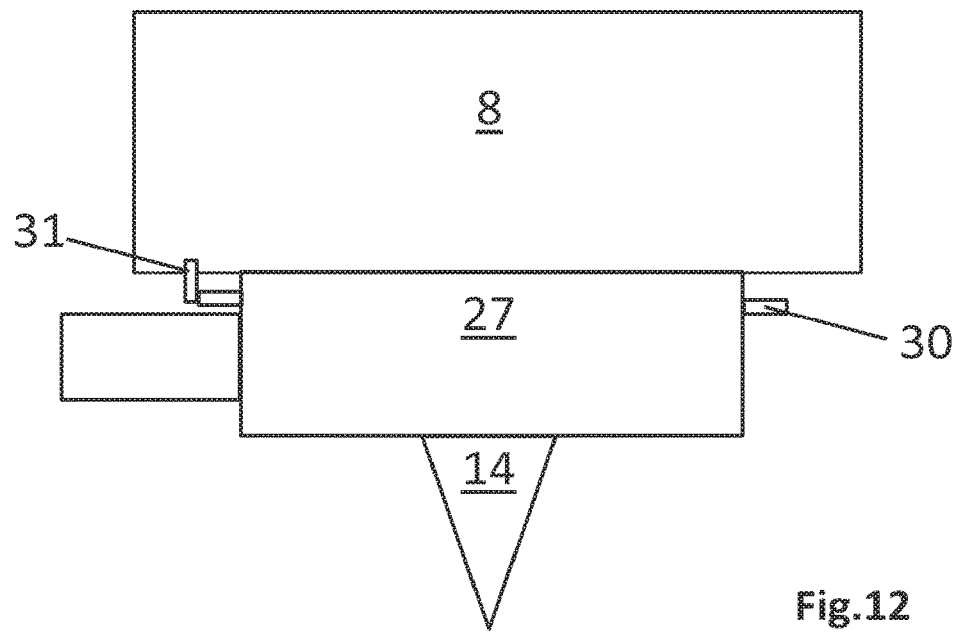
FIGS. 12 to 14 show a laser welding head with examples of a rotational position referencing device of a rotary drive device.
Figure 13:
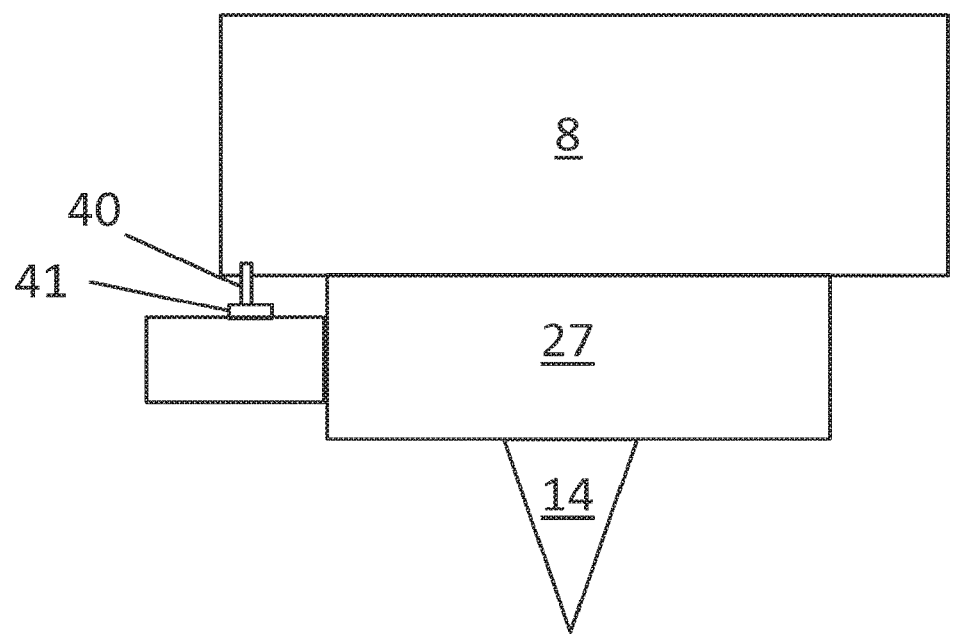
Figure 14:
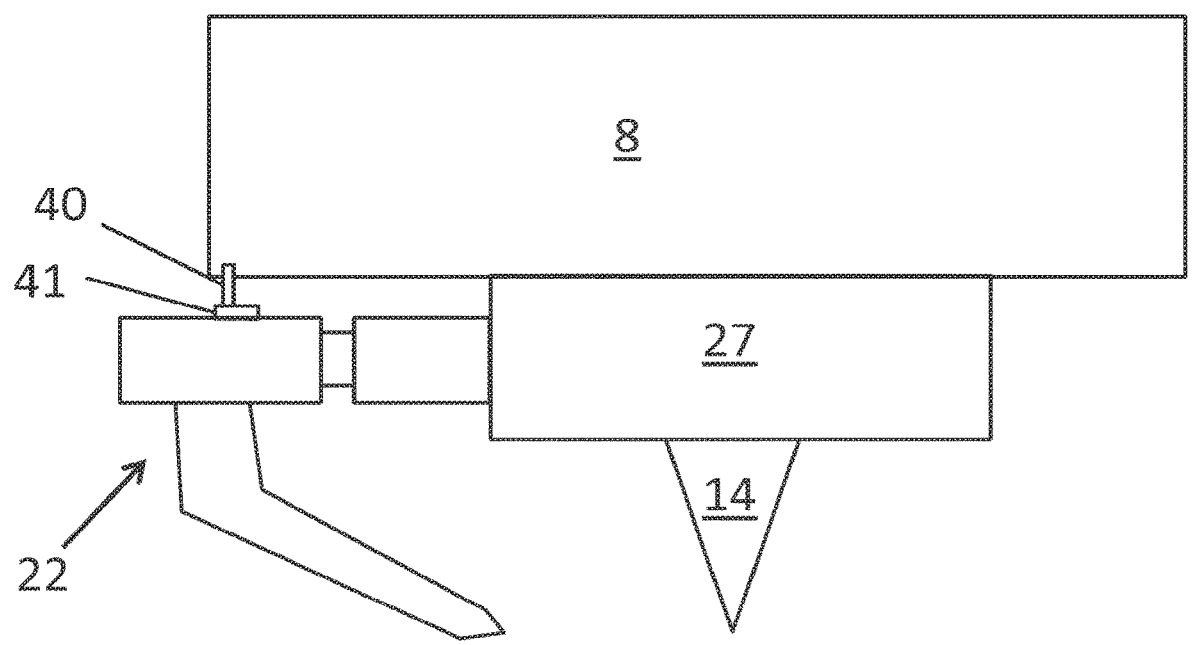

FIGS. 12 to 14 show possible rotational position referencing devices 28 of the rotary drive device 9. In FIG. 12, a cam profile 30 with which a cam follower 31 is in sliding contact is provided on the rotary actuator part 27. By virtue of the cam profile 30, the cam follower 31, depending on the rotational position, assumes a specific tilted position from which the rotational position of the rotary actuator part 27 can be calculated.

In FIG. 13, a proximity sensor 40 that is fastened in a rotationally fixed manner to a housing of the optical system 8 serves for determining whether a reference feature 41, for example a measuring flag, of the coupling for an auxiliary module 10, 22 is disposed directly below the proximity sensor 40. The rotational position represents a predefined reference rotational position of the rotary drive device 9. For example, the reference position can be assumed prior to each machining task in which an auxiliary module is used; to this end, the rotary actuator part 27 is rotated until the proximity sensor 40 detects the presence of the reference feature 41.

FIG. 14 shows an embodiment in which the reference feature 41 is not provided on the coupling on the rotary actuator part 27, but on an auxiliary module 22. On account thereof, the reference feature can be used not only for referencing the rotational position, but also for verifying the presence of the auxiliary module 22. If no presence of the reference feature 41 is detected during the referencing by the proximity sensor 40 after a complete rotation (that is to say after 360 degrees) of the rotary actuator part 27, the absence of the auxiliary module 22 is established. An absence can result, for example, from a collision between the auxiliary module 22 and a workpiece or a clamping device. That is to say that the auxiliary module 22 can be unintentionally released from the coupling in the event of a collision.

Only a few examples of embodiments have been explained with respect to the figures. Besides the modifications already mentioned, many additional modifications are conceivable. For example, the auxiliary module in the case of one variant can have a combined nozzle assembly for a wire and a shield or operating gas, and the machining device is provided with a nozzle magazine. The nozzle assemblies kept ready in the magazine can be used as substitutions with the aid of the coupling device.

The machining unit is described for laser welding of workpieces. However, the machining unit can also be configured as a plasma welding unit, for example.

OTHER EMBODIMENTS

A number of embodiments of the invention have been described. Nevertheless, it will be understood that various modifications may be made without departing from the spirit and scope of the invention. Accordingly, other embodiments are within the scope of the following claims.

What is claimed is:

1. A machining unit for machining a workpiece using a thermal machining beam wherein the thermal machining beam can be directed onto a workpiece by the machining unit along a beam incidence axis to a machining location, the machining unit comprising:
   an optical system for directing and focusing the thermal machining beam onto the workpiece;
   a machining nozzle through which the focused thermal machining beam is guided;
   a rotary drive device disposed between the optical system and the machining nozzle and arranged to rotate about the beam incidence axis, wherein the thermal machining beam passes through the rotary drive device;
   at least one auxiliary module configured to aid workpiece machining, which is coupled to the rotary drive device to rotate about the beam incidence axis under control of the rotary drive device; and a coupling device having a coupling arranged to attach the at least one auxiliary module to a coupling drive configured to move the coupling between a coupled position and an uncoupled position, wherein, when the coupling is in the coupled position, the at least one auxiliary module is either coupled to the rotary drive device and uncoupled from the coupling or coupled to the coupling and uncoupled from the rotary drive device.

2. The machining unit of claim 1, wherein the at least one auxiliary module comprises an infeed device by which an additive or an auxiliary medium can be fed to the machining location where the thermal machining beam acts on the workpiece.

3. The machining unit of claim 1, wherein the at least one auxiliary module comprises a nozzle assembly for a shield gas or an operating gas.

4. The machining unit of claim 1, wherein the at least one auxiliary module comprises an infeed device for a welding additive.

5. The machining unit of claim 4, wherein the welding additive is an auxiliary wire.

6. The machining unit of claim 1, wherein when the at least one auxiliary module is coupled to the rotary drive device, the coupling device can be uncoupled from the at least one auxiliary module.

7. The machining unit of claim 1, wherein the coupling device comprises a loading arm that can be coupled to the auxiliary module.

8. The machining unit of claim 7, wherein the loading arm is arranged to pivot.

9. The machining unit of claim 1, wherein the machining unit comprises second auxiliary modules that are arranged to be rotated about the beam incidence axis by the rotary drive device.

10. The machining unit of claim 1, wherein the machining unit comprises a second auxiliary module that is arranged to move by the coupling device or a second coupling device between a position coupled to the rotary drive device and a position uncoupled from the rotary drive device.

11. The machining unit of claim 10, wherein no auxiliary module, only the first, only the second, or both, auxiliary module/modules is/are couplable to the rotary drive device for the rotational positioning about the beam incidence axis.

12. The machining unit of claim 1, wherein the rotary drive device comprises a safety coupling at an interface to the at least one auxiliary module.

13. The machining unit of claim 1, wherein the rotary drive device comprises a rotary lead-through for an additive or an auxiliary medium, which are feedable from the at least one auxiliary module to the machining location.

14. The machining unit of claim 1, wherein the at least one auxiliary module is arranged to be rotated endlessly about the beam incidence axis by the rotary drive device.

15. The machining unit of claim 1, wherein the coupling drive comprises a linear drive.

16. A machining device comprising: a machining unit for machining a workpiece using a thermal machining beam wherein the thermal machining beam can be directed onto a workpiece by the machining unit along a beam incidence axis to a machining location, the machining unit comprising:
    an optical system for directing and focusing the thermal machining beam onto the workpiece;
    a machining nozzle through which the focused thermal machining beam is guided;
    a rotary drive device disposed between the optical system and the machining nozzle and arranged to rotate about the beam incidence axis, wherein the thermal machining beam passes through the rotary drive device;
    at least one auxiliary module configured to aid workpiece machining, which is coupled to the rotary drive device to rotate about the beam incidence axis under control of the rotary drive device, and
    a coupling device having a coupling arranged to attach the at least one auxiliary module to a coupling drive configured to move the coupling between a coupled position and an uncoupled position, wherein, when the coupling is in the coupled position, the at least one auxiliary module is either coupled to the rotary drive device and uncoupled from the coupling or coupled to the coupling and uncoupled from the rotary drive device;
    a motion drive device by which the machining unit conjointly with the optical system, the auxiliary module, and the coupling device, is movable relative to the workpiece; and
    a nozzle magazine from which nozzles for the auxiliary module are interchangeable by the coupling device.

* * * * *